Figure 1:
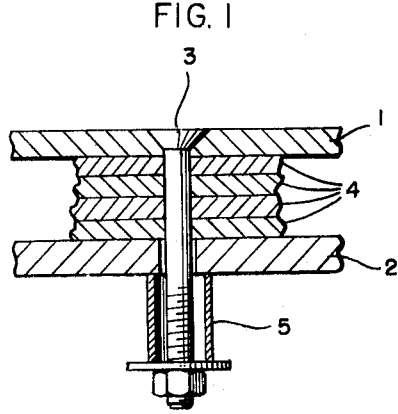

June 14, 1966 R. GAETH ET AL 3,255,559
ELEMENTS FOR SECURING PROTECTIVE SCREENS
TO ARTICLES TO BE PROTECTED FROM THE
ACTION OF HEAT AND FLAMES
Filed Feb. 15, 1963 2 Sheets-Sheet 1

INVENTORS:
RUDOLF GAETH
BERNHARD SCHMITT
RUDOLF BREU

ATT'YS

INVENTORS:
RUDOLF GAETH
BERNHARD SCHMITT
RUDOLF BREU 3,255,559
ELEMENTS FOR SECURING PROTECTIVE SCREENS TO ARTICLES TO BE PROTECTED FROM THE ACTION OF HEAT AND FLAMES
Rudolf Gaeth, Limburgerhof, Pfalz, Bernhard Schmitt, Heidelberg, and Rudolf Breu, Schifferstadt, Pfalz, Germany, assignors to Badische Anilin- & Soda-Fabrik Aktiengesellschaft, Ludwigshafen (Rhine), Germany
Filed Feb. 15, 1963, Ser. No. 258,762
Claims priority, application Germany, Feb. 21, 1962, B 66,039
7 Claims. (Cl. 52—232)

This invention relates to elements for securing protective screens to articles to be protected from the action of heat and flames.

It is known to protect articles from the effect of high temperatures, for example in the case of fire, by a protective screen of incombustible material which is advantageously also a heat-insulating material. It is also known that the heat insulation action of such protective screens is greatly increased if they are spaced from the objects to be protected so as to utilise the heat-insulating properties of the air between the protective screen and the object to be protected. The installation of protective screens often offers considerable difficulty because the necessary securing elements, for example steel pins, screws or rivets, do not satisfy the requirements as regards heat resistance and either melt or become brittle under the action of high temperatures.

U.S. patent application Serial No. 175,823, filed February 26, 1962, by Rudolf Breu, Rudolf Gaeth and Bernhard Schmitt describes and claims a fireproofing composition in the form of sheets or other structural components made therefrom which comprises an alkali metal silicate, preferably sodium silicate, which contains water in an amount of 20 to 70% by weight, preferably 40 to 60% by weight, and fibers, preferably synthetic silicate fibers, in an amount of 10 to 40% by weight, preferably 15 to 25% by weight, said percentages being with reference to anhydrous alkali metal silicate. The alkali silicate should preferably have a molar ratio of alkali metal oxide to silicon dioxide of 1:2 to 1:4, especially 1:2.5 to 1:3.5. The fibers may be glass fibers, mineral wool and the like and should advantageously have a minimum length of 30 mm. These sheets expand to a stable expanded shaped article under the action of heat, for example in the case of fire.

It is an object of the present invention to provide means for securing protective screens to articles to be protected against the action of heat and flames, which do not melt or become brittle under the action of high temperatures. It is a further object of the present invention to provide means for securing protective screens to articles to be protected against the action of heat and flames which under the action of high temperatures are able to enlarge the distance between said protective screens and the article to be protected.

These objects are achieved by securing elements which are surrounded at least partly by at least one plate of alkali metal silicate containing water and fibers, which is arranged parallel to the surface of the article to be protected and which extends at least part of the distance between the protective screen and the said surface.

When small plates of the said kind are exposed to such high temperatures, for example in the event of fire, that the water contained therein boils, they expand, while absorbing heat, to form a layer of stable fine-pored foam so that the elements surrounded thereby are effectively protected against overheating. It is advantageous that the expanding foam should exert pressure on the protective screen and on the article to be protected so that the securing element, for example a nail or dowel, is partly drawn out from its support. The length of the securing element located in the support must naturally be greater than the maximum thickness of foam attainable in order to prevent detachment of the protective screen from the support. The protective action of the screen is greatly enhanced by the enlargement of the space between the protective screen and the article to be protected and by the air cushion thus formed.

The thickness of the small plates of alkali metal silicate to be located between the protective screen and the article to be protected depends on the dimensions of the protective screen and of the article to be protected. In general it is sufficient to use an alkali metal silicate plate which may also be built up from a plurality of thin plates by bonding or the like, having a thickness of 0.4 to 0.6 cm. The alkali metal silicate plates may be thicker or thinner than the said value, according to conditions in individual cases. Said plates' surfaces which lie parallel to the protective screen should, in order to achieve sufficient protection, be at least approximately 5 times as large as the cross-sectional area of the securing element.

In cases when enlargement of the space is undesirable, it is possible not to surround completely with small plates of alkali silicate the part of the securing element between the protective screen and the article to be protected, but to surround a portion of the securing element with a material having a melting point which is below the temperature at which the small plates begin to expand. Upon the action of heat, the said material begins to melt and is compressed at the same time by the expanding alkali metal silicate foam. Thermoplastics, as for example polystyrene foam, impact-resistant polystyrene or polyvinyl chloride, are suitable as readily fusible materials. In this case the thickness of the small plate surrounding the securing element, which small plate may also be composed of a plurality of individual small plates, is so chosen that the foam which forms upon the action of high temperatures more or less fills the space between the protective screen and the support. The length of the small tube made of thermoplastic material is such that the portion of the securing element which is not surrounded with small plates of alkali silicate is completely surrounded by this sleeve. In this way, the protective screen is held rigidly in position.

It is particularly advantageous, for example when the article to be protected is a wall, to allow the securing element to project behind the article to be protected and to surround the projecting portion for example with a sleeve of a readily fusible material. At the end thereof remote from the wall, the sleeve is covered on one side by a small plate, for example a washer, of a thermally stable material, for example iron, rigidly secured to the securing element. Upon the action of high temperatures on the securing element, the sleeve melts and the distance between the protective screen and the surface to be protected, and therefore the protection afforded by the said protective screen, is increased by the pressure of the alkali metal silicate foam expanding between the protective screen and the surface to be protected.

Articles can be provided with excellent protection against heat and flames by means of protective screens incorporating securing elements according to this invention. In particular, steel girders and the like may be provided with protective sheets in this way.

Figure 2:
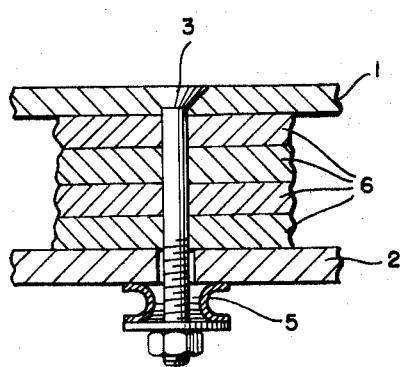

The invention will now be described with reference to the accompanying drawings in which FIGURES 1 and 2 illustrate one embodiment according to the invention, FIGURES 3 and 4 a second embodiment, and FIGURES 5 and 6 a third embodiment. The same reference numerals are used for the same members in FIGURES 1 to 4.

Referring to FIGURE 1, an article 2 to be protected is provided with a protective screen 1 of incombustible material held in position by a screw 3. Four small plates 4 of alkali metal silicate containing water and fibers are interposed between the screen 1 and the article 2. The screw 3 passes through an orifice in the article 2 and the projecting portion of the screw is surrounded by a sleeve 5 of a readily fusible material which is held in position by a metal washer.

FIGURE 2 illustrates diagrammatically the arrangement shown in FIGURE 1 after the occurrence of a fire. The small plates 4 have expanded to layers of foam 6 and the pressure thereby exerted on the screen 1 and transferred to the screw 3 has deformed the sleeve 5, which has become plastic under the action of the heat, so that the distance between the screen 1 and the article 2 has been increased.

Figure 3:
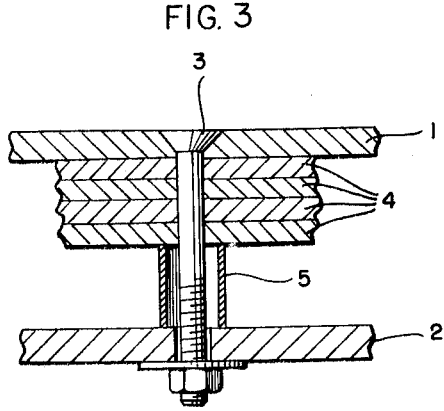

In the embodiment shown in FIGURE 3, the sleeve 5 surrounding the screw 3 is arranged between the small plates 4 and the article 2, instead of being behind the article 2.

Figure 4:
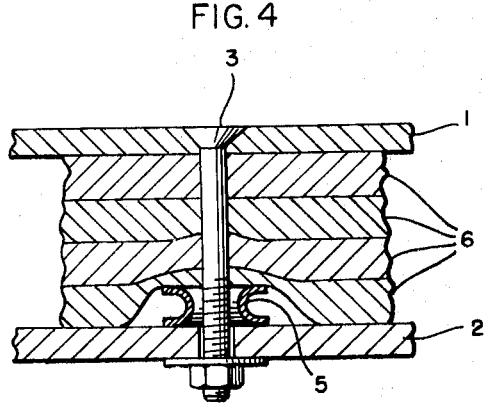

FIGURE 4 illustrates the arrangement shown in FIGURE 3 after a fire has occurred. Here again the small plates 4 have expanded to a layer of foam 6 and compressed the sleeve 5. In this case, however, there has been no change in the distance between the screen 1 and the article 2.

Figure 5:
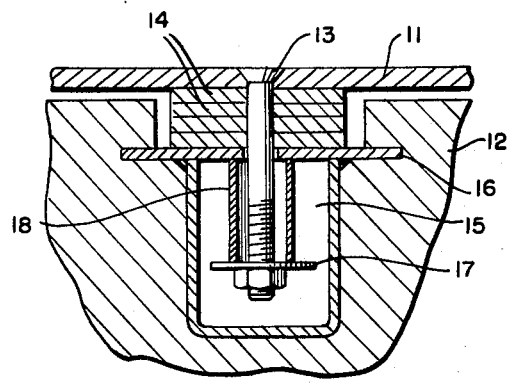
Figure 6:
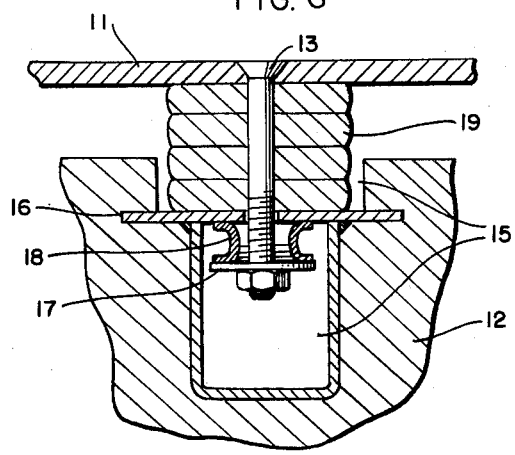

In the embodiment shown in FIGURES 5 and 6, the securing element is located in a depression in the article to be protected.

In this arrangement, the protective screen 11 lies on the surface of the article 12 to be protected and is secured thereto by screws 13. Small plates 14 of alkali metal silicate are arranged in a depression 15 divided into two portions by a plate 16, for example a metal plate having an orifice for the passage of the screw 13. Behind the plate 16, the screw 13 is surrounded by a sleeve 18 of readily fusible material which rests against a washer 17 of greater diameter than the sleeve 18.

When high temperatures act on the outer surface of the protective screen 11, the sleeve 18 softens owing to thermal conduction, and the small plates 14 expand to form a layer of foam 19 which forces the protective screen 11 away from the article 2.

The following example further illustrates the invention.

*Example*

A plywood board 40 x 25 cm. in area and 0.5 cm. in thickness is attached to a piece of sheet iron of the same area and a thickness of 0.6 mm. by means of five screws having a thickness of about 4 mm. Between the plywood board and the sheet iron each of the screws is surrounded by four apertured discs 1.2 mm. in thickness made of an alkali metal silicate containing 55% of water and 15% of glass fibers, with reference to anhydrous alkali metal silicate. Each disc has a diameter of 40 mm. The diameter of the aperture in each disc is 5 mm. The rear end of each screw, beyond the plywood board, is provided with a sleeve of impact-resistant polystyrene 30 mm. in length and having an internal diameter of 6 mm. Each sleeve is pressed firmly against the plywood board by a nut having an external diameter of about 8 mm.

After each screw has been exposed for about fifteen minutes to the flame of a Bunsen burner on the side of the iron sheet, the distance between the plywood board and the iron sheet has increased to about 25 mm.

We claim:
1. A manufacture which comprises: a structure which is to be protected from the effect of heat and flames; a protective screen of incombustible material spaced from said structure; a securing element connecting said structure to said protective screen, said securing element including compensating means for maintaining the connection between the structure and the protective screen even though the distance between said structure and said screen is increased; and heat expandable and fireproof material between said structure and said screen, the amount of said heat expandable material being sufficient to increase the distance between the structure and said screen under the influence of heat.

2. A manufacture which comprises: a structure which is to be protected from the effect of heat and flames; a protective screen of incombustible material spaced from said structure; a securing element connecting said structure to said protective screen, said securing element including compensating means for maintaining the connection between the structure and the protective screen even though the distance between said structure and said screen is increased; and heat expandable and fireproof material between said structure and said screen and surrounding said securing element, said heat expandable material consisting of at least one plate of an alkali metal silicate which contains water in an amount of 20 to 70% by weight and fibers in an amount of 10 to 40% by weight, said percentages being with reference to anhydrous alkali metal silicate, said alkali metal silicate having a molar ratio of metal oxide to silicon oxide of 1:2.5 to 1:3.5.

3. A manufacture as in claim 2 wherein the plate has a thickness of 0.4 to 0.6 cm. and wherein the surface of said plate is in contact with the surface of said structure to be protected.

4. A manufacture as in claim 2 wherein the plate is built up from a plurality of thin plates, wherein the combined plate has a thickness of 0.4 to 0.6 cm., and wherein said plate is in contact with the structure to be protected and the protective screen.

5. A manufacture as in claim 3 wherein said compensating means consists of a sleeve surrounding said securing element, said sleeve being formed from a readily fusible material having a melting point below the temperature at which the plates begin to expand.

6. A manufacture which comprises: a structure which is to be protected from the effect of heat and flames; a protective screen of incombustible material spaced from said structure; a securing element connecting said structure to said protective screen, one end of said securing element projecting beyond said structure; a sleeve surrounding said securing element in said area beyond said structure, said sleeve being held in place by a washer of a thermally stable material, said washer having a diameter greater than the diameter of the sleeve; and heat expandable and fireproof material between said structure and said screen and surrounding said securing element in the area between said structure and said screen, said heat expandable material consisting of at least one plate of an alkali metal silicate which contains water in an amount of 20 to 70% by weight and fibers in an amount of 10 to 40% by weight, said percentages being with reference to anhydrous alkali metal silicate, said alkali metal silicate having a molar ratio of metal oxide to silicon oxide of 1:2.5 to 1:3.5, said sleeve surrounding said securing element in the portion beyond said structure consisting of readily fusible material having a melting point below the temperature at which said expandable material begins to expand.

7. A manufacture as in claim 6 wherein the readily fusible material is a thermoplastic selected from the group consisting of polystyrene and polyvinyl chloride.

References Cited by the Examiner

UNITED STATES PATENTS

| | | | |
|---|---|---|---|
| 1,151,289 | 8/1915 | Saino | 52—232 |
| 1,972,005 | 8/1934 | Berbeck | 52—393 |
| 2,100,624 | 11/1937 | Beckwith | 52—464 |
| 2,142,164 | 1/1939 | Young et al. | 52—232 |
| 2,256,961 | 9/1941 | Pearson et al. | 52—407 |
| 2,756,159 | 7/1956 | Kendall | 106—84 |
| 2,945,653 | 7/1960 | Atkin | 52—573 |
| 3,019,864 | 2/1962 | Lester | 52—407 |
| 3,031,044 | 4/1962 | Stitt et al. | 52—508 |

FRANK L. ABBOTT, *Primary Examiner.*

JACOB L. NACKENOFF, *Examiner.*

J. E. MURTAGH, *Assistant Examiner.*